W. T. DORGAN & W. J. LAMBE.
PROCESS FOR FORMING THREADED NUTS.
APPLICATION FILED MAR. 26, 1917.

1,261,014.

Patented Apr. 2, 1918.

WITNESSES
D. K. Bradford
Julia C. Olsen

INVENTORS
William T. Dorgan
William J. Lambe
BY
Cyrus W. Rice
their ATTORNEY ized.

UNITED STATES PATENT OFFICE.

WILLIAM T. DORGAN, OF GRAND RAPIDS, AND WILLIAM J. LAMBE, OF DETROIT, MICHIGAN.

PROCESS FOR FORMING THREADED NUTS.

1,261,014.     Specification of Letters Patent.     Patented Apr. 2, 1918.

Application filed March 26, 1917. Serial No. 157,355.

*To all whom it may concern:*

Be it known that we, WILLIAM T. DORGAN, residing at Grand Rapids, in the county of Kent and State of Michigan, and WILLIAM J. LAMBE, residing at Detroit, in the county of Wayne and State of Michigan, citizens of the United States, have invented new and useful Improvements in Processes for Forming Threaded Nuts, of which the following is a specification.

The present invention relates to threaded nuts and bolts, and its object is to provide a simple and economical process for forming such a nut as will in one rotary position thereof pass freely over the threads of a bolt which are interrupted or mutilated in the bolt's longitudinal direction.

This object is attained by the process hereinafter described, an example of the invention's application being shown in the accompanying drawings, in which:—

Figure 4:
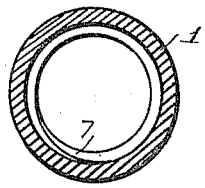
Fig. 4 is a transverse section of said cap before the same is expanded as hereinafter described.

This invention may be applied to various uses where bolts and nuts of the character described are employed. In the example chosen for illustration by the drawings and for detailed description in the body of this specification, the nut formed by the process of this invention is the dust cap 1 of the valve box 2 of the valve of a pneumatic tire 3 carried by an automobile wheel 4. This valve box is of common form, being in relation to the cap, a bolt, with opposite flattened sides 5, the threads 6 being interrupted or mutilated in the bolt's longitudinal direction by such flattened sides. The cap or nut is first made in the usual way, hollow cylindrical in form with continuous threads 7, as shown in cross section in Fig. 4, and of metal adapted to be expanded.

The process of this invention consists in expanding this nut or cap in a radial direction angularly disposed relatively to another radial direction of the nut, as by so expanding it in the radial direction indicated by a line drawn between the letters E, F (Fig. 3) which direction is angularly disposed to such other radial directions as that indicated by a line drawn between the letters A, B of said figure. This expansion is carried far enough that the interior of the expanded portion may pass freely over the threads of the bolt or box, when the nut is turned to its rotary position shown in Fig. 3 and the nut is thrust on the bolt in its longitudinal direction, the unexpanded portion of the nut moving along the flat sides of the bolt: but when the nut is turned to another rotary position,—at right angles to its position shown in said figure — the threads 8 on the unexpanded portion of the nut engage the threads of the bolt, and the nut may be screwed down. It will be seen that the nut may be instantly thrust over the bolt to the desired position and then turned to proper adjustment, whereby time and labor is greatly economized.

Figure 1:
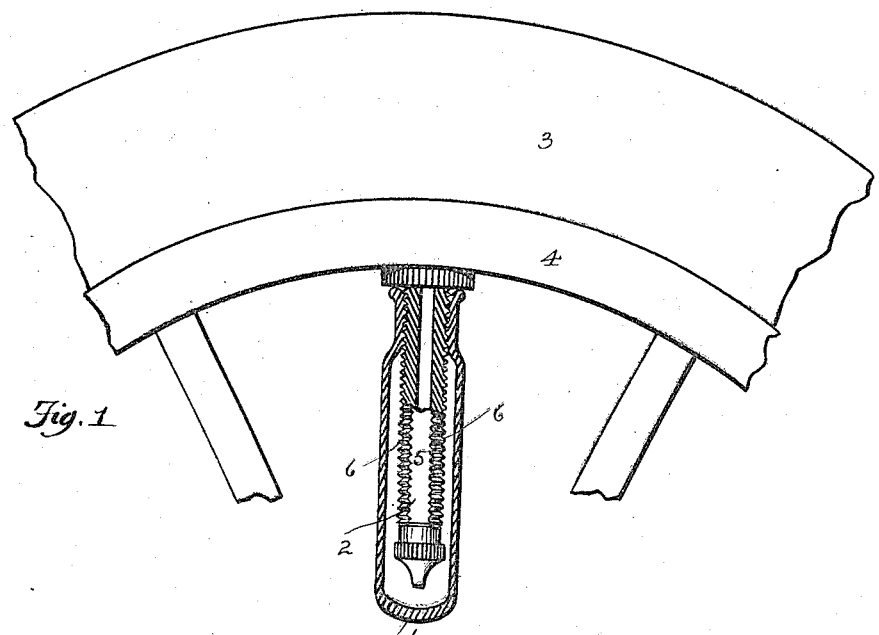
Figure 1 is a view of a portion of an automobile wheel having a pneumatic tire with valve shown partly in central axial section.
Figure 3:
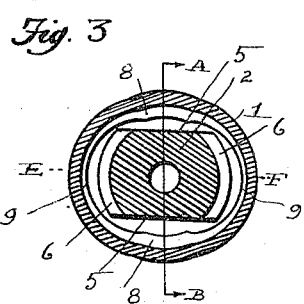
Fig. 3 is a transverse section of the same taken on a plane corresponding to line C—D of Fig. 2.
Figure 2:
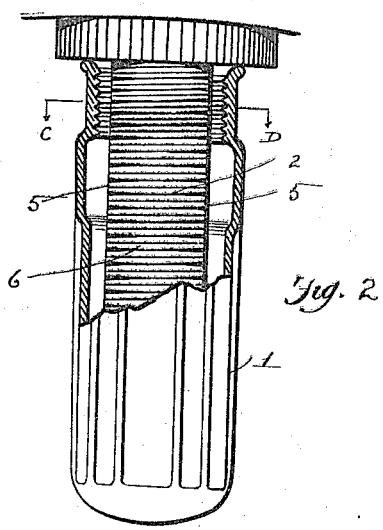
Fig. 2 is another illustration of the same viewed from a point at right angles to Fig. 1, and showing the valve cap partly in central axial section taken on a plane corresponding to line A—B of Fig. 3.

If the threads 8 should become "stripped", the nut may be then expanded in the direction of the line A—B of Fig. 3, which action will draw in the previously expanded portion of the nut so that its threads 9 will engage the threads of the bolt. The life of the nut may be thus extended.

What is claimed is:

The process of forming a nut whose threads are adapted to engage in one rotary position of the nut the threads of a bolt which are interrupted in the bolt's longitudinal direction and to disengage the bolt's said threads in another rotary position of the nut; which process consists in expanding a nut having a continuous thread in a radial direction angularly disposed relatively to another radial direction of the nut, and sufficiently that such expanded portion of the nut may freely pass over the threaded portion of the bolt in the bolt's longitudinal direction.

In testimony whereof we have hereunto set our hands.

WILLIAM T. DORGAN.
WILLIAM J. LAMBE.

Copies of this patent may be obtained for five cents each, by addressing the "Commissioner of Patents, Washington, D. C."